United States Patent [19]
Hogan

[11] 3,973,170
[45] Aug. 3, 1976

[54] INTRINSIC SAFETY BARRIER
[75] Inventor: James A. Hogan, Hatfield, Pa.
[73] Assignee: Honeywell Inc., Minneapolis, Minn.
[22] Filed: Sept. 9, 1974
[21] Appl. No.: 504,451

[52] U.S. Cl. ................................ 317/16; 317/15; 317/31; 333/79
[51] Int. Cl.² .................... H02H 7/20; H02H 3/20
[58] Field of Search .............. 317/14 R, 15, 16, 149, 317/31; 333/77, 78, 79, 13; 340/150; 325/323, 362, 473, 477, 380, 25, 482; 334/89, 71; 323/89 P, 89 R, 89 C; 179/170 C, 170 J, 170 D, 170 E, 170 G, 170 H

[56] References Cited
UNITED STATES PATENTS

| | | | |
|---|---|---|---|
| 2,089,179 | 8/1937 | Black | 179/170 J |
| 2,854,514 | 9/1958 | Ensink et al. | 179/170 J X |
| 2,855,571 | 10/1958 | Kleespies | 333/78 |
| 2,886,788 | 5/1959 | Cushman et al. | 333/78 |
| 2,941,041 | 6/1960 | Ensink | 179/170 G X |
| 3,387,266 | 6/1968 | Swartwout et al. | 340/150 |
| 3,656,062 | 4/1972 | Wlasuk | 325/362 |
| 3,684,924 | 8/1972 | Miller, Jr. | 317/18 B |
| 3,699,272 | 10/1972 | Fritz | 333/79 |
| 3,792,288 | 2/1974 | Friedlander | 323/89 R X |
| 3,793,560 | 2/1974 | Schultheis | 317/14 R |
| 3,839,692 | 10/1974 | Plasko | 317/15 |

OTHER PUBLICATIONS
"Line–Sharing Systems for Plant Monitoring and Control"; Aronson; Jan. 1971, pp. 68–69.

Primary Examiner—J D Miller
Assistant Examiner—Patrick R. Salce
Attorney, Agent, or Firm—Laurence J. Marhoefer; Lockwood D. Burton; George E. Bodenstein

[57] ABSTRACT

A data communication system for an industrial plant includes a plurality of communication stations which are interconnected by a coaxial cable that is required to pass through one or more hazardous areas. The communication stations are energized from a source of alternating voltage of commercial frequency and are arranged to transmit over and to receive from said cable communicating signals that have frequencies which are substantially higher and that have an energy level which is substantially lower than that of the frequency and energy level, respectively, of the power source. Each of said stations is coupled to the cable by an individually associated intrinsic safety barrier each of which includes an iron core transformer. Each transformer includes a primary winding connected in circuit with the associated station and an inductively coupled secondary winding that is connected between the sheath and the internal conductor of the cable. Resistors and fuses are included in the transformer primary winding circuit to interrupt the latter upon an apparatus failure or other occurrence that results in direct application of the power source voltage to the primary winding.

14 Claims, 6 Drawing Figures

WAVEFORM AT TERMINALS
S1-S2 (ON 75 OHM LINE)

INTRINSIC SAFETY BARRIER

BACKGROUND OF THE INVENTION

1. Field of the Invention

This invention relates to an intrinsic safety barrier having utility in electronic process control systems comprising a central station and a plurality of remote stations connected to said central station and to each other by a single, time-shared, high density, coaxial cable or data highway.

2. Description of the Prior Art

In electronic process control systems comprising a central station and a plurality of remote stations, the central station generally is located in a control house and the remote stations are located in the field at strategically located areas. Control systems of this type find extensive application in industrial processes involving petroleum refineries and chemical plants. While the several stations are generally not located in hazardous or unsafe areas, it is frequently necessary for the interconnecting cable or data highway to pass through such hazardous areas. Incendivity considerations concerning the data highway thus become of extreme importance. This is because of an inherent danger of accidental or other destruction of the highway and release of an explosion-igniting arc. A flame-proof or explosion proof installation of the data highway is an answer, although an unsatisfactory one, to the problem.

Hazardous and non-hazardous areas have been defined in the literature, and have been referred to as "Zones." Zones 0, 1 and 2 are defined by the International Electrochemical Commission, as follows:

Zone 0 — An area or enclosed space within which any flammable or explosive substance, whether gas, vapor or volatile liquid, is continuously present.

Zone 1 — An area within which any flammable or explosive substance, whether gas, vapor or volatile liquid is processed, handled or stored, and where during normal operations an explosive or ignitable mixture is likely to occur.

Zone 2 — An area within which any flammable or explosive substance, whether gas, vapor or volatile liquid, although processed or stored, is so well under conditions of control that the production of an explosive or ignitable concentration is only likely under abnormal conditions.

These terms are generally accepted in the industrial market areas, with the exception of the United States where the Zones are called Divisions. Division I includes Zones 0 and 1 and Division II includes Zone 2. Hereinafter the term Division will be used.

The concept of intrinsic safety in electronic process control systems is known in the prior art. The concept is based upon the restriction of electrical energy levels in field mounted components that may be located in a Division I area, for example, under normal or abnormal conditions, to a point well below that which could produce an explosion-igniting arc. Intrinsic safety in such systems thus is dependent upon the electrical circuit design rather than upon arc-containing explosion-proof enclosures, or other external physical protective measures.

A form of intrinsically safe barrier that has been proposed in the prior art and which depends upon electrical circuit design is the so-called Zener diode barrier. This barrier comprises a Zener diode which is connected in shunt to the interconnecting cable or highway and an associated series resistor and a fuse. Zener diode barriers have been subject to certain disadvantages, however, resulting from the capacitance of the Zener diode and the power and voltage loss introduced by the series resistance which must be relatively large. As a result of the relatively high capacitance of the Zener diode, higher frequency signals are shunted whereby the frequency of the intelligence or data signals that can be transmitted on the data highway is limited. This seriously limits the information density, that is, the amount of information that can be transmitted in a given period of time. A further and particularly important disadvantage of the Zener diode and resistor arrangement as an isolating barrier is that the connection between the safe and unsafe areas is galvanic. This is because with such a barrier there is a direct electrically conductive connection between the safe and unsafe areas. As a result, with such a barrier, the data highway would have to be grounded at the central station and at each of the remote stations where such a barrier is employed. Differences in ground potential along the data highway tend to establish circulating currents in the cable sheath which cause the introduction of spurious signals into the highway cable that interfere with the data signals.

The intrinsic safety barrier of the present invention provides a practicable alternative to a flame-proof installation of the data highway, which would be prohibitively expensive, and avoids the foregoing disadvantages of the Zener diode barrier whereby an improved intrinsically safe data communications system is achieved.

SUMMARY OF THE INVENTION

Among the objects of the present invention is the provision in an electronic process control system having interconnected stations of an intrinsic safety barrier for a high density interconnecting data highway in which the energy in the highway, in the normal transmission mode, is so small as to be incapable of providing an explosion-igniting arc in Division I areas through which the data highway passes.

Another object of the present invention is the provision of an intrinsic safety barrier for such an interconnecting data highway in which the Division I and Division II areas are galvanically isolated.

A further object of the present invention is the provision for use with such an interconnecting data highway of an intrinsic safety barrier that introduces minimal capacitance effects whereby the intelligence or data signals transmited by the highway may be of significantly higher frequency and the density of signal and transmission desirably enhanced.

Still another object of the present invention is the provision for use with such an interconnecting data highway of an intrinsic safety barrier that is capable of absorbing, during abnormal voltage overload conditions, a large current flow while maintaining the integrity of the galvanic isolation provided by the barrier.

The intrinsically safe barrier according to the present invention is operative to interconnect, in an intrinsically safe and galvanically isolated manner process control units or communications stations located in Division II areas, a single data highway or coaxial cable that typically passes through one or more Division I areas, and other process control units or communication stations located in other Division II areas.

Typically, the impedance of the data highway in a petroleum refinery installation, for example, may be 75 ohms, and the intelligence or data signals are digital data electrical current pulses having a frequency of the order of 250,000 Hertz (Hz) and a nominal 0.9 volt peak voltage. Thus, the peak current flow is very small being of the order of 12 milliamperes. The energy in such digital data current pulses, accordingly, is very small, and if allowed to escape to the atmosphere, as by cutting or other destruction of the cable, is insufficient to produce an explosion-igniting arc. If means are provided to limit the energy therein to such a small value, such an interconnecting data highway is said to be intrinsically safe.

The digital data intelligence current pulses are applied to the data highway by the communications stations. Energization of these stations is generally derived from a commercial source of alternating current of frequency, for example, 50 or 60 Hz. Suitable rectifiers generally are provided to produce operating direct current voltages for the commumication station components. The line voltage and such operating direct current voltages provide significantly higher energy levels than that present in the data pulses on the data highways. If accidentally applied to the data highway, such higher energy levels would be more than ample to provide an explosion-igniting arc.

The communications stations also include appropriate means for the production of the intelligence digital data current pulses and for the transmission of such pulses over the data highway, and for selectively receiving and selectively responding to such data pulses transmitted over said data highway from other communications stations.

The intrinsic safety barrier according to the present invention includes an inductive device or transformer having an iron core and a primary winding and a secondary winding for coupling digital data pulses applied to the primary winding by a communications station to the data highway which is connected to the secondary winding. The transformer turns ratio, the impedance of the windings, and the physical construction are such that the transformer in effect is transparent, that is, provides an "open window" in both directions to the relatively high frequency electrical digital data pulses on the data highway between the central station and the remote stations and between the latter. The transformer, however, effectively is opaque and blocks alternating currents of the relatively low frequency of 50 or 60 Hz or direct current in the primary winding from being coupled to any significant extent to the secondary winding. This is due to a saturation effect in the primary winding. Thus, the transformer construction is such that the impedance of the transformer primary winding drops off at low frequencies and effectively acts as a short circuit for currents of such low frequencies, thereby, allowing heavy currents to flow through the primary winding without the transfer of any significant amount of energy to the secondary winding. The physical construction is such that the transformer can withstand such heavy currents flowing in the primary for short intervals without any significant heating. Desirably, the currents that are allowed to flow through the primary winding on such abnormal condition are limited by suitable resistors. For guarding against overload conditions that may be sustained for undesirably long periods, fuses may be placed in the circuit with the primary winding connections to interrupt the circuit.

Thus, the intrinsic safety barrier of the present invention allows an efficient transfer of the digital data intelligence signals between the communications stations and the data highway while higher energy alternating current of low frequency and direct current are precluded from application in any significant amount to the data highway even if applied, accidentally or otherwise, directly to the primary winding of said barrier. This effectively limits the amount of electrical energy that can escape to the data highway, upon such abnormal occurrence, to a value well below that which could produce an explosion-igniting arc.

Thus, with the intrinsically safe arrangement of the present invention, the energy in the data highway, which when installed must pass through hazardous Division 1 areas, is so small as to be incapable, in the normal transmission mode, of producing an explosion-igniting arc. Additionally, the alternating voltage and direct current supply means provided in the communication stations are incapable of producing an energy level in the data highway high enough to produce an explosion-igniting spark, even upon failure or other abnormal condition of such power supply means. The intrinsic safety barrier of the present invention thus constitutes an important improvement to the intrinsic safety of the overall communications system; and, further, permits a desirable higher density of intelligence signals on the data highway.

Other objects and advantages of the invention will become apparent from the detailed description hereinafter, considered together with the following drawings.

DETAILED DESCRIPTION OF THE EMBODIMENT

Figure 1:
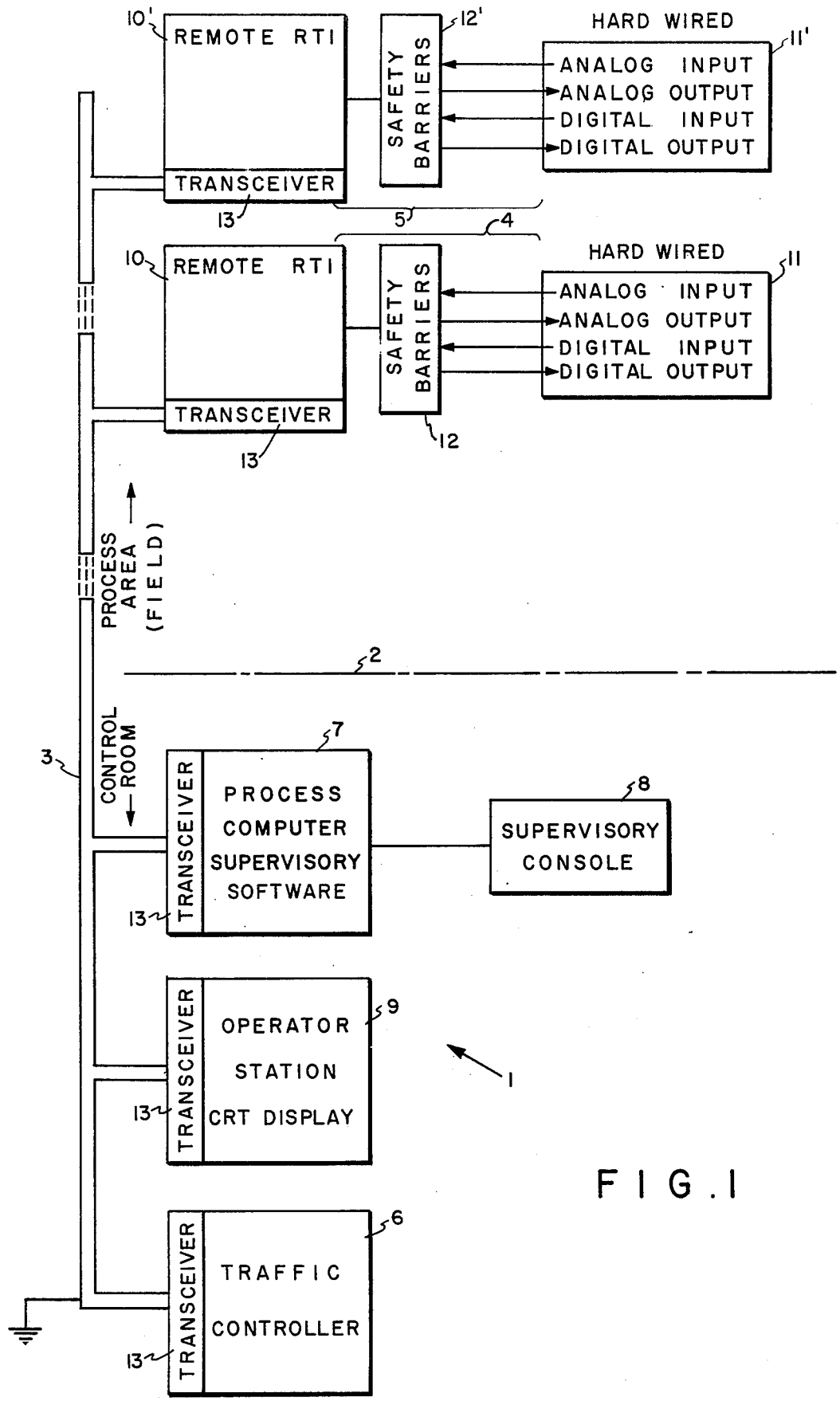
FIG. 1 is an illustration of a system including a central station and a plurality of remote stations connected to each other by a single, time-shared, coaxial cable.

FIG. 1 illustrates an electronic process control system comprising a central station 1 which is located in a control room 2 and is connected by a coaxial cable or data highway 3 to a plurality of remote information acquisition stations indicated generally at 4 and 5. The coaxial cable is connected to ground at one point only along its length, specifically, at the central station, as shown. The central station 1 is arranged to issue command signals in digital form over the data highway 3 to the remote stations 4 and 5, and is arranged also to receive information signals in the form of digital pulses from the remote stations over the said data highway. Additionally, the remote stations 4 and 5 typically may be arranged to communicate with each other over the said data highway 3, again by the transmission and receipt of digital pulses. The central station 1, accordingly, is provided with the capability of "calling up" or addressing each remote station by sending out as many different coded address signals as there are remote stations. Upon receipt of its uniquely coded address signal, each remote station is activated to carry out its function of acquiring information from process sensors associated therewith and transmitting such information over the data highway to the central station and to other remote stations. Each such remote station, upon such occurrence, typically may send command signals to the process elements under its control, for example, for directing and effecting process condition adjustments; and, additionally, may aquire from the central station and possibly from other remote stations updated information, for example, as to specific requirements of that part of the process with which it is most directly concerned.

The functional capabilities of the central station 1 are shown in FIG. 1 as comprising a traffic director or controller indicated at 6, at which the sheath of coaxial cable 3 is connected to true ground, a process computer including a data highway interface and supervisory software, as indicated at 7, a supervisory console indicated at 8, and an operator's station, including a cathode-ray tube display, indicated at 9. The function of the traffic controller is to control access to the data highway by the several system components. The traffic controller 6, process computer 7, supervisory console 8 and operator's station 9 per se comprise no part of the present invention and, therefore, are not described in detail herein. Such devices are known in the prior art and may take many different forms. Advantageously, however, the operator's station may take the form, for example, of the display and control system that is illustrated in the copending application of Renzo Dallimonti bearing Ser. No. 546,321, filed Feb. 3, 1975, and assigned to the assignee of the present invention.

The functional capabilities of the several remote station 4 and 5 are each shown as comprising a real time interface unit 10, 10'; etc. Each remote real time interface unit 10, 10'; etc. is associated with a sub-system of the industrial plant or process. The apparatus of the present invention has especial utility for use in installations involving hazardous atmospheres such as those encountered in processes involving the production of chemicals or the refining of petroleum.

Sub-systems of the process associated with the remote stations 4 and 5 are indicated at 11, 11'; etc. Each sub-system includes a plurality of process sensing and control devices for measuring process variables such as temperatures, pressures, flows, etc. and includes suitable input/output equipment for providing analog and digital input and output electrical signals. In practice, it has been found that each sub-system is capable of handling 8 process control loops, although other size sybsystems, for example, 16 loops, may be accommodated, if desired. The input/output equipment comprising each sub-system is not illustrated in detail since the configuration of such equipment per se comprises no part of the present invention and may take forms well known in the prior art. It is contemplated, however, that safety barriers, may be employed between the sub-systems 11, 11'; etc. and their associated remote/-real time field mounted units 10, 10'; etc. Such safety barriers may be of the known Zener diode, resistance and fuse type construction described hereinbefore for limiting the amount of energy that may be transferred from the Division II to the Division I areas to values below that at which an explosion-igniting arc will be produced. Such safety barriers have been indicated generally at 12, 12'; etc.

Figure 2:
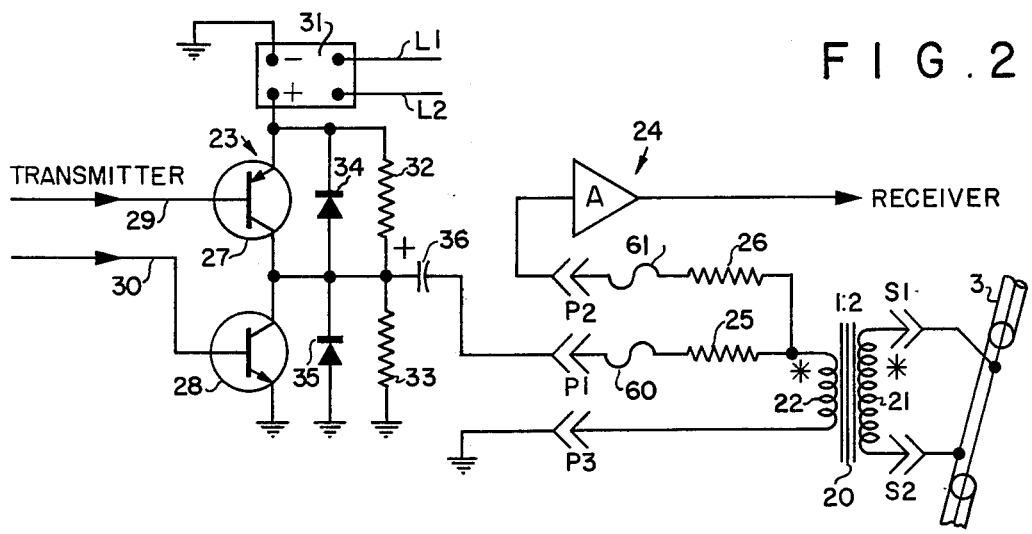
FIG. 2 is a schematic diagram including the intrinsically safe barrier or interface according to the present invention.

In accordance with the present invention there is associated with each of the several process units described, both at the central station and at the remote field stations, a transceiver which has been identified by the reference numeral 13. Each such transceiver, in the preferred embodiment of the invention, is configured, as is illustrated in FIG. 2 and includes an iron core transformer 20 having characteristics as described hereinafter, and having a secondary winding 21, the terminals S1 and S2 of which are connected respectively to the central conductor and sheath of the coaxial cable or data highway 3, as shown. The transformer 20 also includes a primary winding 22 having a first terminal that is connected by a connector or contact P3 to ground potential and second terminal that is connected by respective connectors or contacts P1 and P2 to suitable digital pulse transmission equipment, a portion of which is indicated at 23, and to digital pulse receiving equipment indicated at 24. The connection from the said second terminal of primary winding 22 to the contact P1 includes a resistor 25, and the connection from that winding terminal to the contact P2 includes a resistor 26. With the transformer 20 having the characteristics described hereinafter and employed with transmission and receiving equipment as contemplated herein, the resistors 25 and 26 may have values, respectively, of 174 ohms and 619 ohms. Desirably, the magnet wire employed in windings 21 and 22 and the tape, wrap, encapsulating material, etc. must be suitable for the environmental conditions encountered and also is of the required dielectric strength.

As shown in FIG. 2, the digital transmission equipment 23 includes transistors 27 and 28 each of which has base, emitter and collector electrodes. Digital pulse signals to be transmitted are coupled to the base electrodes of each of the transistors 27 and 28 by a respectively associated input connection 29 and 30. Direct current energization is provided for the emitter-collector electrode circuits of the transistors 27 and 28 by a suitable direct current power supply or rectification means indicated at 31 that is energized from alternating currrent supply lines, $L_1$ and $L_2$. The latter provide alternating energizing voltage of commercial frequency, for example 50 or 60 Hz.

Thus, the emitter of transistor 27 is shown connected to the positive output terminal of the power supply means 31 and emitter of transistor 28 is shown connected to ground, the latter being the negative terminal of the power supply. The collector electrodes of the transistors 27 and 28 are connected together and to the junction of a pair of resistors 32 and 33. The other terminal or resistor 32 is connected to the positive terminal of supply 31 and also to the emitter electrode of transistor 23. The other terminal of resistor 33 is connected to ground. As shown, two diodes 34 and 35 are connected in parallel to the resistors 32 and 33, respectively. The junction of the resistors, diodes and collectors is connected by a capacitor 36 to the contact P1 and by resistor 25 and transformer winding 22 and contact P3 to ground.

In the illustrated embodiment, the resistors 32 and 33 each desirably may be of the same value, for example, 12,100 ohms. As a consequence, the voltage at the junction of these resistors will be half that provided by the power supply means 31. Typically, the direct current voltage provided by the rectification means 31 may be 24 volts and as a result the voltage at the junction of the resistors 32 and 33 and across capacitor 36 will be 12 volts. The transistors 27 and 28 are both normally biased to a non-conductive state. Note that the capacitor 36 conductively isolates the transmitter 23 from transformer 20.

In the operation of the digital transmitter illustrated, upon the selective application of a digital signal pulse to the base electrode of transistor 27, the latter will be rendered conductive, whereupon the full direct current supply voltage from supply 31 will be applied to the winding 22 of transformer 20 through the capacitor 36 and resistor 25. The direction of this current pulse through the transformer winding 22 will be downward, as seen in FIG. 2.

Upon the selective application of a digital pulse to the base electrode of transistor 28, the latter will be rendered conductive whereupon the voltage across capacitor 36 will be discharged to ground by the transistor and, hence, applied to the transformer winding 22. This will produce a pulse of current through the transformer primary winding 22 in an upward direction.

Thus, by the selective application of digital pulses to the base electrode circuits of transistors 27 and 28, current pulses of one polarity or the other will be produced through the transformer primary winding 22.

Figure 3:
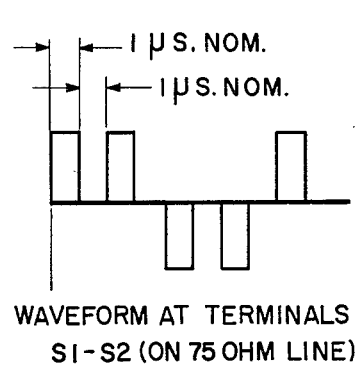
FIG. 3 illustrates a typical wave form at the terminals S1 and S2 and in the diagram of FIG. 2.

There is illustrated in FIG. 3 typical wave forms that are produced at the terminals S1 and S2 of the winding 21 of the transformer when current pulses of one polarity or of the other polarity are produced in the transformer primary winding 22. Typically, the frequency of the digital signal pulses provided at the terminals S1 and S2 either from the digital transmitter 23 or received over the data highway or coaxial cable 3 from the central station or from a remote station is 250,000 Hz. With the digital transmitter inactive and such digital pulses received at the terminals S1 and S2 from either the central station or from another remote station on the data highway, such digital pulses are coupled by the transformer 20 to the digital receiver indicated at 24. The digital receiver 24 responds to those signals when the code of the received digital signals is that to which it is uniquely receptive. The receiver 24 is activated upon the receipt of such code to perform its designated functions of acquiring information, and activating an associated digital transmitter, such as the transmitter 23, for sending such information to the central station or to another remote station, and for issuing appropriate command signals to the hard-wired analog and digital control devices associated with each sub-system of the process. Digital pulses produced by the digital transmitter are appropriately coded by means not illustrated to the end that there is selective response to the transmitted signals either at the central station or at an associated remote station.

Figure 4:
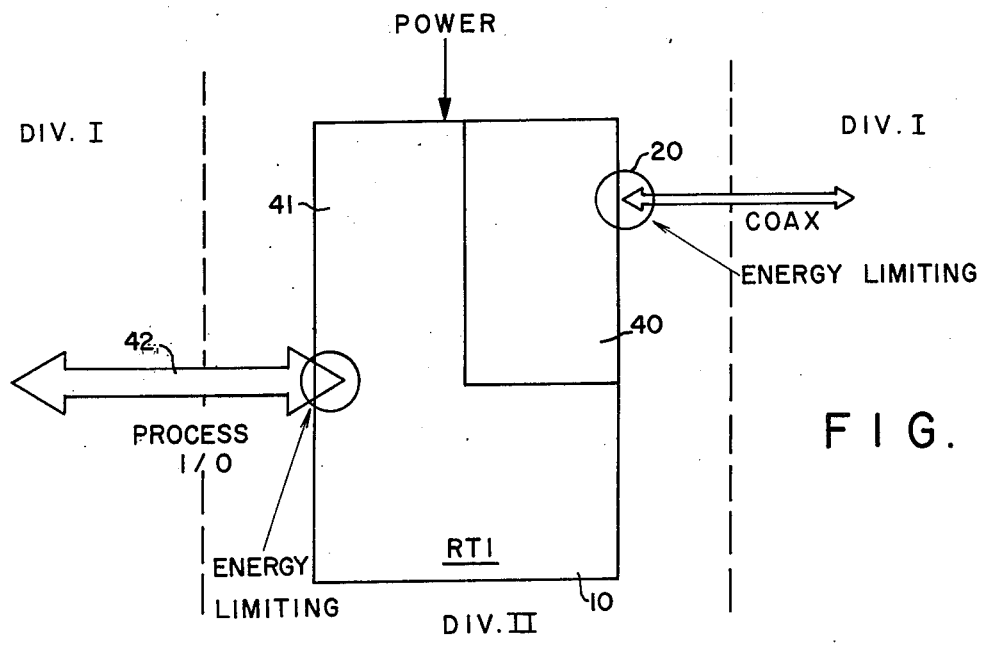
FIG. 4 is a block diagram illustrating the real time interface at the remote stations between the data highway and the hard-wired process input/output units.

FIG. 4 further illustrates, in block diagram form, a typical application of the present invention in effecting safe coupling between process control components located in Division I and Division II areas. As seen in FIG. 4, the real time interface 10 includes a first portion indicated at 40 comprising a cable or data highway interface having associated therewith a coupling iron core transformer such as the transformer 20 shown in FIG. 2. Desirably, also, the portion 40 of the rest time interface includes a digital transmitter and a digital receiver, as illustrated in FIG. 2. The real time interface 10 also includes a second portion indicated at 41 which may be hard wire connected to the cable interfacing portion 40.

It is contemplated, in the apparatus arrangement of FIG. 4, that the real time interface portion 41 is coupled in an energy limiting manner to the several process sensors and process controlling devices. This coupling is indicated generally by the reference numeral 42. As those skilled in the art will understand, this coupling, in the case of analog inputs such as those derived from thermocouples or other milivolt producing devices may include safety barriers such as the aforementioned Zener diode, resistor and fuse structures.

Figures 5, 6:
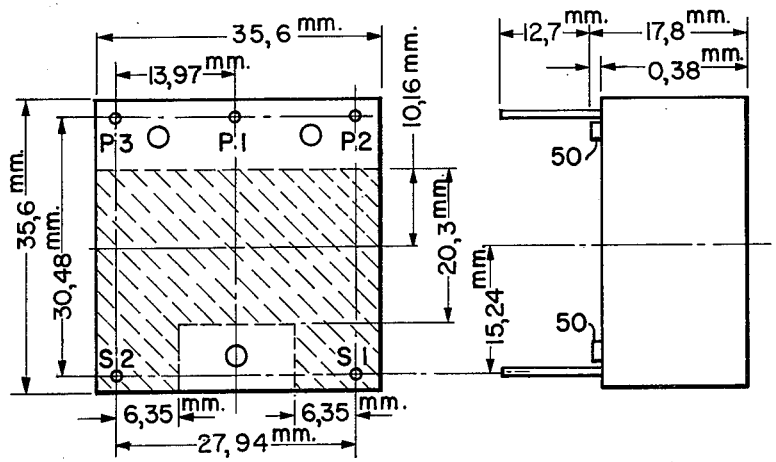
FIG. 5 and 6 illustrate bottom and side views of a preferred physical emodiment and mounting arrangement of the intrinsic safety barrier.

FIGS. 5 and 6 illustrate further characteristics of the iron core transformer 20 that has been described by reference to FIG. 2. The transformer 20 is an epoxy-encapsulated transformer and desirably is arranged for mounting on a printed wiring board with the circuit components illustrated in FIG. 2. To that end and for effecting desired isolation from other printed wiring board components, stand-off projections 50 are provided. The location and number of stand-off projections 50 is optional within limits. However, the shaded area shown in FIG. 5 must be free of projections, and the stand-off projections 50 desirably provide a parallel seating plane. A minimum of three such stand-off projections must be provided. In a practical embodiment, the dimensions of the transformer, the location of the projections and the location of the terminals S1 and S2 relative to the location of the terminals P1, P2 and P3 are shown in FIGS. 5 and 6.

In said preferred embodiment, the transformer ratio of primary winding to secondary winding turns is 1:2, is indicated in FIG. 2, and the transformer primary and secondary windings are insulated by epoxy from each other and, as noted, are epoxy encapsulated. The shape of the transformer core is not critical, but should be such as to effect close efficient magnetic coupling, as known in the art. One form that the core may take is that of a warqqed iron tape, in toroidal form, the iron having the required magnetic properties.

A construction in which the primary and secondary winding overlap each other may be provided in order to effect such desirable efficiency of coupling. The construction is such also as to assure galvanic isolation of the primary winding 22 with respect to the secondary winding 21, under both normal conditions and abnormal conditions involving the application of destructive voltage and energy levels to the primary winding terminals. In addition, as noted, the energy limiting resistors 25 and 26 connected in the primary winding circuit are employed to limit the current that may flow through the primary winding thereby to insure the intrinsic safety of the data highway. To that end preferably the resistors 25 and 26 are of a type, for example, metal film resistors that are operative upon application of full line voltage on the primary winding 22 to open the primary winding circuit without melting, causing a flame, producing excessive heat or otherwise causing transformer destruction that might result in a conductive connection between the transformer's primary and secondary windings. Desirably, the resistors 25 and 26 are built in as part of the transformer 20.

The transformer 20 initially and importantly is characterized in its frequency response and saturation characteristics. That is to say, for applied current pulses of the high frequency digital pulse signals to be transmitted or received over the data highway 3, the transformer 20 effeiciently transfers the pulses between the primary and secondary windings. For direct currents or for pulsating or alternating currents of commercial frequencies such as 50 or 60 Hz, however, the transformer effectively restricts or limits the transfer of energy from the primary winding 22 to the secondary winding 21 to a value well below that required for producing an explosion-igniting spark in a Division I area through wich the coaxial cable may pass.

Specifically, for digital data signals of the high frequency in the data highway, that is, 250,000 Hz, for example, the impedance of the primary winding 22 is relatively high and efficient transmission of the pulses to the secondary winding is achieved. For low frequency voltages and currents, however, that is 50 or 60 Hz, or direct current, the impedance of the primary winding 22 decreases significantly, and as a result, a relatively heavy current is allowed to flow through the primary winding to saturate the transformer, and thereby to limit the transfer of energy to the secondary winding 21.

With this arrangement, even though full line voltage should accidentally or otherwise abnormally be applied to the terminals of the transformer winding 22, the transformer is effective to limit the energy transfer to the Division I area. Additionally, if an abnormal application of low frequency voltage to the transformer terminal P1 and P2 and P3 should persist over any period of time at a level lower than that which will cause the resistors 25 and 26 to open the primary circuit, the resistors 25 and 26 are effective to dissipate and to limit the energy applied to the transformer winding 22 to a value below that at which undesired heating and possible destruction of the transformer will result. It will be recognized in this connection that excessive heating of the transformer is to be avoided since such heating may tend to cause internal breakdown of the transformer and consequent destruction of the galvanic isolation afforded by the transformer. In order to avoid a situation where there is a gradual, that is, more than a very brief or transient, application of a low frequency voltage to the transformer primary winding 22 that is capable of destroying the transformer, fuses indicated at 60 and 61 are provided in series with the resistors 25 and 26, respectively. These fuses force a positive disconnection of the abnormal or offending circuit from the transformer primary winding; and, hence, from the data highway. Desirably, the fuses 60 and 61 as well as the resistors 25 and 26, are built in as part of the transformer construction thereby enabling rapid response to abnormal current flow, and also guarding against the possible use of the transformer without such fuses being connected in the circuit, thus, avoiding possible by-pass or omission of the fuses.

With this arrangement, upon instantaneous or gradual application of a voltage up to 240 volts RMS, 50 or 60 Hz, to the primary winding 22, the case of the transformer will not melt or crack and no flame, explosion or melted material will occur, and the integrity of the galvanic isolation between the primary and secondary windings will be maintained. The transformer technology for producing a transformer having these characteristics is known and, therefore, further description thereof will not be provided herein.

Thus, there has been provided in accordance with the present invention an improved intrinsic safety barrier for providing intrinsic safety in an industrial process control system of the type comprising a central station and a plurality of remote stations that are connected to each other and to the central station by a single, time-shared coaxial cable or line and wherein portions of said line may pass through a hazardous area, for example, an explosive environment. The coaxial cable may comprise a known type transmission line in which one conductor completely surrounds the other, wherein the sheath and line are coaxial and are separated by a continuous solid dielectric or by dielectric spacers with an appropriate gas as the principal insulating material.

The embodiments of the invention in which an exclusive property or privilege is claimed are defined as follows:

1. For use in a data communications system for an industrial plant having hazardous and non-hazardous areas, the data communications system comprising a plurality of communications stations each of which generally is located in a non-hazardous area, said communications stations being interconnected by a coaxial cable that passes through at least one hazardous area, at least one of said communications stations being adapted to be energized from a source of alternating voltage of commercial frequency and being operative to produce for transmission over, and to receive from, said cable electrical communications signals having frequencies substantially higher and an energy level substantially lower than the frequency and energy level, respectively, of said source, an intrinsic safety barrier coupling at least one of said stations to said cable in a manner limiting to a predetermined small value the level of energy that may be transmitted to said cable by said station, said barrier comprising a transformer having a first winding connected in circuit with said one station and an inductively coupled second winding connected between the sheath and the internal conductor of said cable, said first winding and said second winding being wound on a magnetic core having the property of efficiently magnetically transferring energy between said first and second windings at the frequencies of and low energy level of said electrical communications signals, but of saturating and subtantially blocking the transfer of energy between said first and second windings at the frequency and high energy level of said alternating voltage source.

2. Apparatus as specified in claim 1 wherein the core of said transformer is toroidal in form and comprises wrapped tape of magnetic material.

3. Apparatus as specified in claim 1 wherein said one station includes a transmitter having an output circuit, wherein said intrinsic safety barrier includes a resistor and a fuse, and wherein said resistor and said fuse are connected in series with said first winding to said transmitter output circuit, said resistor and said fuse being so selected that in the event of sudden failure of said transmitter and the direct application of the voltage of said source to said first winding the said resistor will interrupt the circuit to said first winding, and in the event of gradual failure insufficient to cause the said resistor to interrupt the circuit to said first winding, the said fuse will be activated to open the circuit to said first winding.

4. Apparatus as specified in claim 3 wherein the output circuit of said transmitter includes a capacitor whereby said first winding of said transformer is conductively isolated from said transmitter, and wherein said first and second transformer windings are galvanically isolated.

5. Apparatus as specified in claim 1 wherein said one station includes a transmitter having an output circuit and a receiver having an input circuit, wherein said intrinsic safety barrier includes first and second resistors and first and second fuses, and wherein said first resistor and said first fuse are connected in series with said first winding to said transmitter output circuit, and wherein said second resistor and said second fuse are connected in series with said first winding to the input circuit of said receiver, whereby in the event of sudden failure of said transmitter or receiver and the direct application of the voltage of said source to said first winding the associated first or second resistor will interrupt the circuit to said first winding, and in the event of gradual failure insufficient to cause the said associated first or second resistor to interrupt the related circuit to said first winding, the associated first or second fuse will be activated to open the related circuit to said first winding.

6. Apparatus as specified in claim 5 wherein said first and second resistors and said first and second fuses are included with said first and second windings and said core of said transformer as part of an encapsulated structure.

7. Data communications apparatus including a communications station arranged to handle communications signals and to be powered from an electrical power source supplying energizing energy of a frequency which is low compared to the frequency of said signals, a communications cable, and an intrinsic safety barrier coupling said station to said cable, said barrier comprising a transformer having a core, a first winding connected to said station, and a second winding connected to said cable, said core being characterized in its efficient magnetic transfer of energy between said windings, and hence between said station and said cable, at the frequency of said signals, and by its property of saturating at the frequency of said energizing energy, and hence substantially blocking the transfer of energy at the last-mentioned frequency between said windings and hence to said cable, whereby upon direct application of said energizing energy to said first winding, the quantity of said energizing energy allowed to reach said cable is limited to an acceptable value.

8. Apparatus as specified in claim 7 including a first resistor and a first fuse, and first means to apply said signals to said first winding in series with said first resistor and said first fuse.

9. Apparatus as specified in claim 8 wherein said first resistor and said first fuse are included with said first winding and said second winding and said core as part of an encapsulated structure.

10. Apparatus as specified in claim 8 wherein said first resistor and said first fuse are so selected that, in the event of abnormal operation resulting in the direct application of said energizing energy to said first winding, said first resistor is operative to interrupt the circuit to said first winding, and, in the event of abnormal operation resulting in gradual application of said energizing energy to said first winding which is insufficient to cause said first resistor to interrupt the circuit to said first winding, said first fuse will be activated to open the circuit to said first winding.

11. Apparatus as specified in claim 8 including a pair of terminals to which a receiver responsive to the frequency of said signals may be connected, and including a second resistor and a second fuse, and second means to connect said second resistor, said second fuse, and said first winding in series to said pair of terminals.

12. Apparatus as specified in claim 11 wherein said first and said second resistors and said first and said second fuses are included with said first and said second windings and said core as part of an encapsulated structure.

13. Apparatus as specified in claim 11 wherein said first and said second resistors and said first and said second fuses are so selected that, in the event of abnormal operation resulting in direct application of said energizing energy to said first winding by the connection including either said first means or said second means, the associated first resistor or second resistor is operative to interrupt the related circuit to said first winding, and, in the event of abnormal operation resulting in gradual application of said energizing energy to said first winding which is insufficient to cause the associated first resistor or second resistor to interrupt the related circuit to said first winding, the associated first fuse or second fuse will be activated to open the circuit to said first winding.

14. An intrinsic safety barrier as specified in claim 7 wherein said core is toroidal in form and comprises wrapped iron tape.

* * * * *